Feb. 7, 1950     J. R. WOODYARD     2,496,837
ULTRA HIGH FREQUENCY APPARATUS
Filed Sept. 20, 1946
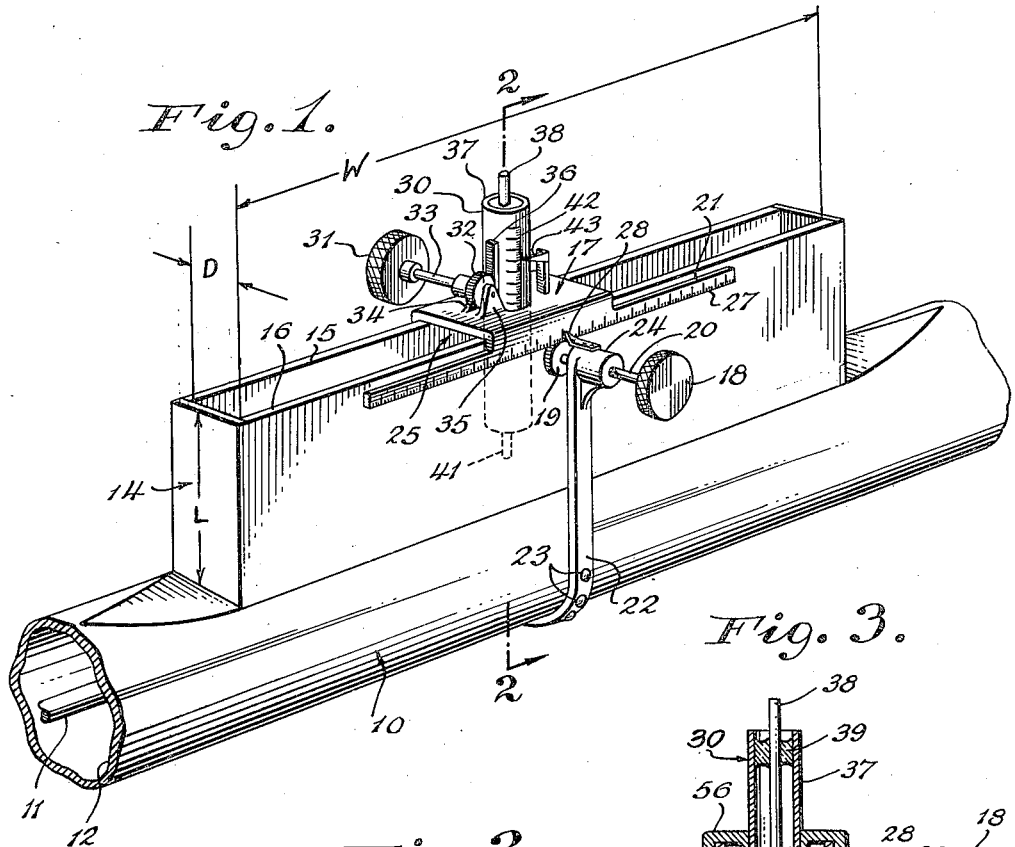
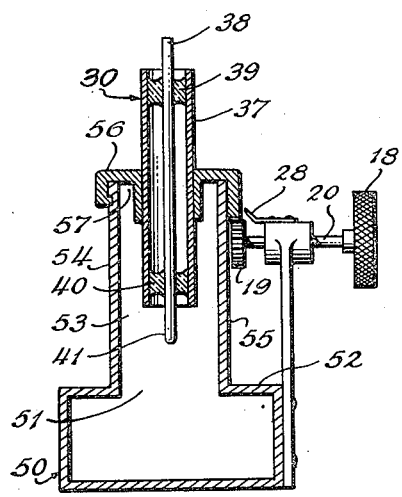
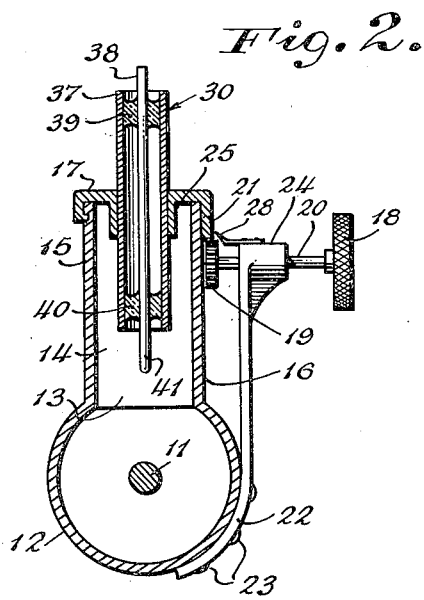
INVENTOR
JOHN R. WOODYARD
BY
Paul B. Hunter
ATTORNEY Patented Feb. 7, 1950

2,496,837

UNITED STATES PATENT OFFICE 2,496,837

ULTRA HIGH FREQUENCY APPARATUS

John R. Woodyard, Berkeley, Calif., assignor to The Sperry Corporation, a corporation of Delaware Application September 20, 1946, Serial No. 698,361

17 Claims. (Cl. 178—44)

This invention relates to ultra-high-frequency electrical apparatus and more particularly to improvements in standing wave detectors using travelling probes.

In the construction of conventional standing wave detectors, a narrow slot is provided in the wall of a section of wave guide or in the outer conductor of a section of coaxial line (both of which will hereinafter be termed "transmission lines"). This narrow slot permits a pickup device, such as a probe or loop, to be inserted into the section of transmission line in order to measure the electric field at various positions along this section. To prevent radiation of the energy conducted or guided by the transmission line, the slot is usually made very narrow. However, as a result of such a narrow slot, little energy is picked up by the probe or loop unless it is actually inserted through the slot directly into the transmission line itself. Such pickup insertion brings about several undesirable but directly resulting effects. First, the presence of the pickup device within the transmission line causes the electric field pattern to be distorted, which in turn may result in incorrect field strength readings. Another undesirable result of probe insertion is realized as the probe is moved longitudinally along the slotted line while making standing wave ratio measurements. If the probe extends into the electric field within the transmission line, great care must be taken to maintain the probe depth constant as it is moved longitudinally along the line. Otherwise, the electric field strength variations which the probe experiences will not be entirely due to variations resulting from longitudinal displacement of the probe but will be due in part to the variations in probe depth or vertical displacement as it is moved longitudinally. When one considers the magnitude of the vertical or radial field gradient in most transmission systems, it is easily seen that even very minute displacements of the probe in its vertical or radial position as it is moved longitudinally make it very difficult to recognize those longitudinal electric variations due to the presence of standing waves.

Another source of error and contributing factor in erratic operation of conventional standing wave detectors results from current flow from one side of the slot to the other through the sliding contacts of the probe carriage and through the body of the probe carriage itself, if it be constructed of a conducting material. Such current flow may easily change the electric field strength within the transmission line either adding to or subtracting from it depending upon the phase of the current. This current flow is extremely troublesome since the contact resistance between the probe carriage and the transmission line varies with pressure, wear, and the degree of brightness of the sliding contact itself. Thus, successive field strength readings under otherwise similar conditions may vary considerably because of variations in this current flow.

These difficulties are overcome to a substantial extent in the present invention by providing a standing wave detector in which the probe does not protrude into the main transmission line. Furthermore, several new, advantageous features over conventional standing wave detectors are realized by the present invention. Among these are greater probe excitation, a provision for linear attenuation of probe excitation, and the possibility of making standing wave ratio measurements using the so-called "constant deflection" method.

It is, therefore, an object of the present invention to provide a standing wave detector having a moving pickup device which is relatively insensitive to vertical and tangential displacements of the pickup device.

Another object of the present invention is to provide a standing wave detector in which the pickup device is able to respond to longitudinal variations of electric field strength in a transmission system without distorting the electric field therein.

Still another object is to provide a standing wave detector in which the pickup device receives ample excitation without the necessity of its protruding into the transmission line itself.

A further object of the present invention is to provide a standing wave detector having a pickup device carriage with a sliding contact area, in which little or no current flows through the carriage or across the sliding contact surface of the carriage.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

A still further object of the invention is to provide a standing wave ratio measuring device in which the pickup unit may have its vertical position linearly calibrated in logarithmic units as in decibels.

Briefly, the invention consists in mounting a wave guide, dimensioned below cut-off at the operating frequency, on a section of transmission line in which it is desired to measure the standing wave ratio or electric field strength. This wave guide section is mounted so that it is coupled at one end to the transmission line by means of the customary longitudinal slot in the wall of the transmission line. The other end of the wave guide is left open and supports a movable carriage for the energy pickup device.

In a standing wave detector constructed in this manner it is unnecessary for the pickup element to protrude inside the transmission line in which it is desired to measure the standing wave ratio. This eliminates the possibility of distorting the field pattern within the transmission line. Furthermore, while the pickup element responds to variations in the energy measured along the line itself, it is possible to decrease the sensitivity of the element to displacements normal to the direction of energy propagation within the line.

The achievement of these and other objects by the present invention will become more apparent from the description, taken in connection with the accompanying drawing wherein:

Fig. 1 is a perspective view partially in section of a standing wave detector employing a preferred form of the present invention in which a coaxial-type transmission line is used, Fig. 2 is a cross-section of the detector shown in Fig. 1, taken along line 2—2, and Fig. 3 is a cross-section of another type of standing wave detector employing a preferred embodiment of the present invention in which the transmission line is of the wave guide type.

Referring now more particularly to Fig. 1 of the drawing, there is shown a perspective view, partially in section, of a standing wave detector embodying the present invention in a preferred form. In this embodiment, a section of coaxial transmission line 10 is provided having an inner conductor 11 and an outer conductor 12. For purposes of simplification, the end joints or couplings of coaxial line section 10 have been omitted as well as the inner conductor supports. A longitudinal slot 13 is provided in the outer conductor 12. This slot 13 couples the section of coaxial line 10 to a wave guide section 14 formed of two rectangular conducting plates 15 and 16. Each of these rectangular plates 15 and 16 has one of its longer edges joined to the outer conductor 12 along the edge of slot 13, making their separation distance D equal to the slot width. This separation distance D corresponds to the thickness of wave guide section 14, whose width W is the same as the length of slot 13 and whose length L is measured normal to the axis of coaxial line section 10, parallel to the plates 15 and 16.

A probe carriage 17 is mounted on the free end 25 of wave guide section 14 which is left open, the other free edges of plates 15 and 16 being connected by closure plates. Its longitudinal position may be varied by rotating a knob 18 which is connected to a gear 19 through shaft 20. Gear 19 meshes with the teeth of a rack 21 which is fastened to probe carriage 17. Strap support 22 is fastened firmly to the outer conductor 12 by screws 23 and supports the knob assembly by means of a bushing 24 fixed to support 22.

Coaxial line section 30 passes vertically through probe carriage 17, and may have its vertical position controlled by a knob 31 fixed to a gear 32 by a shaft 33 which is supported by bearings 34 and 35, mounted on the top of probe carriage 17. Rotation of knob 31 moves the coaxial line section 30 along a vertical line by virtue of the gear 32 meshing with rack-like portion 36 formed in outer conductor 37 of section 30.

Reference to Fig. 2, which is a cross-sectional view of Fig. 1 taken along line 2—2, shows coaxial line section 30 in greater detail. Inner conductor 38 is rigidly and coaxially supported within outer conductor by insulating beads 39 and 40. Pickup probe 41 is formed by the extension of inner conductor 38 beyond the end of outer conductor 37 which is inside wave guide section 14.

The outer end of movable coaxial line section 30 may be formed in any conventional manner, so that it may be connected to a suitable indicating element. In practice, a flexible coaxial line could be used to connect coaxial line section 30 to the indicating element, in which case outer conductor 37 could be externally threaded at its outer end so as to make connection to such a flexible coaxial line. Any conventional type of indicating element could be used, such as a direct current milliammeter which measures the flow of current through a rectifying unit connected across the inner and outer conductors of coaxial line section 30 by means of such a flexible coaxial line as mentioned above. A silicon or germanium crystal unit may be used as the rectifier, although other methods of detecting, such as the use of diodes, could also be used. For simplicity, the indicating element and connecting means are omitted from the drawings, and the outer end of center conductor 38 is shown extending beyond the outer end of outer conductor 37.

As is well known, excitation of a wave guide dimensioned below cutoff for a particular mode will result in creating fields within the guide, but there will be no real propagation of energy in that mode. These excited fields within such a wave guide diminish in amplitude exponentially with distance from the point of excitation, which in this case would be the end of the wave guide coupled to the longitudinal slot in the transmission line. The excited fields will be maximum at the slot and decrease with distance measured along the guide and normal to the line having the slot. If $E_0$ is considered to be the electric field excited at the end of the guide, measured at a particular point along the exciting slot, the electric field E within the guide at a distance Z down the guide from the excited end is given by:

$$E = E_0 e^{-\alpha Z}$$

where $\alpha$ is a function of the wavelength of the exciting energy and the cutoff wavelength of the guide itself for the mode which the system is attempting to excite within the guide and $e$ is the base of the natural logarithm. Since $E_0$ is considered to be the field excited by the energy within the transmission line at a particular point along the transmission line, longitudinal variations in the energy within the transmission line, such as would be the case if standing waves existed, would cause a corresponding variation in $E_0$. If the electric field is measured within the excited wave guide at various positions along its width at a constant distance $Z_1$ from the exciting slot, the same longitudinal variation in electric field will be found as in $E_0$ itself, but attenuated by an amount dependant upon the value of $Z_{in}$ and $\alpha$. Thus, longitudinal variations in the energy within the transmission line may be measured by measuring the variations in the excited electric field within the coupled wave guide at a fixed distance, Z, along the wave guide from the excited end.

The measured field strength within the guide, of course, will also vary as the pickup device is moved away (vertically) from the excited end of the guide, as Z is increased. The rate at which this change occurs will depend upon the constant $\alpha$. Since $\alpha$ is dependant upon the cutoff wavelength of the guide, its value can be changed by changing the physical dimensions of the guide. By making this rate sufficiently small, it is possible to make the pickup device relatively insensitive to vertical displacements within the guide, that is in the Z direction, without changing its response to longitudinal variation of the excited field within the guide; this longitudinal variation being caused by corresponding longitudinal energy variations within the transmission line.

In operation, coaxial line section 10 is inserted in tandem into a coaxial line transmission system whose standing wave ratio it is desired to measure. The electromagnetic energy which passes through line section 10 attempts to excite the wave guide section 14 through slot 13 and cause propagation vertically upward along its length to the open end 25. Since the depth D of this wave guide section 14 is purposely kept sufficiently small so that the guide is dimensioned below cut-off, there will be no real propagation of energy down its length. The dimension of depth D is determined from the following relation:

$$\lambda_c = \frac{2W}{\sqrt{m^2 + \left(\frac{W}{D}n\right)^2}}$$

where $\lambda_c$ is the cut-off wavelength, W is the width dimension of the wave guide section, D is the depth dimension of the wave guide section, and $m$ and $n$ are the first and second subscripts describing the mode of the electromagnetic energy with which the wave guide 14 is excited.

By proportioning the dimensions of the wave guide section 14 so that $\lambda_c$ is smaller than the wavelength of the energy conveyed by the transmission line 11, 12 of Fig. 1 (or line 50 of Fig. 3), an electric field is excited within the guide section 14 which decreases in amplitude exponentially with distance away from the slot 13 toward open end 25. The pickup probe 41 responds to the electric field strength within the wave guide section 14, extracting energy from the field in an amount proportional to the square of the electric field strength at the point of pickup.

As the pickup probe 41 is moved vertically away from slot 13 by knob 31, the amount of energy extracted by the probe 41 decreases. Since the field within the wave guide section 14 decreases exponentially, and since the energy picked up by the probe 41 is proportional to the square of the electric field strength at the point of pickup, the resulting decrease in pickup or attenuation, measured in decibels, due to the vertical motion of the probe is a linear function of the distance which the probe is displaced. This gives a very convenient method of varying the amount of energy pickup of probe 41 at any point along its longitudinal path.

As the probe carriage 17 is moved longitudinally, that is, along the width of wave guide section 14, the pickup probe will respond to longitudinal variations in the electric field excited within the wave guide section 14. Since this electric field is excited by the field within the coaxial line section 10, any longitudinal variations measured within the wave guide section 14 are the result of corresponding longitudinal energy variations within the line section 10. Thus, by moving probe carriage 17 along the width of wave guide section 14 by rotation of knob 18, the presence of standing waves within the transmission system are detected, and by measuring the magnitude of energy picked up by probe 41 at various points along the wave guide section 14, the standing wave ratio itself may be determined. For measurement purposes a scale 27 may be provided on the outer face of rack-like portion 21 which acts in conjunction with index 28 on support 22.

Although the pickup element in this embodiment is shown as a probe which responds to the electric field at the point of pickup, any other type of pickup device might be used, such as a small pickup loop.

The amount of excitation which slot 13 gives to wave guide section 14 is dependent upon its width. Since the excited electric field diminishes exponentially, there is little danger of radiation from the open end 25, even though the slot width D is much greater than that provided in conventional slotted standing wave detectors. Increased excitation is helpful if the standing wave ratio to be measured is low. On the other hand, there is little danger of excessive excitation since intentional vertical displacement of the pickup probe provides a convenient method of attenuation.

The attenuation due to the vertical displacement of the pickup probe not only removes the danger of excessive excitation, but permits measurements to be made using the "constant deflection" method of measurement. As is well known, any nonlinearity of the detecting or indicating element will give rise to errors in measurement unless properly corrected. By nonlinearity is meant that the output of the indicating element will not correspond exactly proportionally to changes in the electric field strength as the probe is moved, but corresponds in some nonlinear fashion depending upon the characteristics of the rectifying unit used in the output indicating element. Therefore, the point to point measurements must be corrected if they are to give a true indication of the corresponding point to point variation in electric field strength.

By using the vertical displacement attenuation properties of the present invention, such a correction may be eliminated. What is done, instead, is to displace the pickup probe in a vertical direction to offset the changes in the output readings caused by a given horizontal displacement of the pickup probe 17. By noting the amount of vertical displacement necessary to return the indicating element to its original deflection or reading, it is then possible to read the attenuation directly in decibels. This is true regardless of any non-linearities in the rectifying unit of the indicating element, since it is operating at the same point on its characteristic curve for all readings. For convenience, in such measurements a decibel scale 42 may be provided on the wall of outer conductor 37 which acts in conjunction with an adjustable pointer 43 which serves as a fiducial point.

Another advantage of the present invention over conventional slotted type standing wave detectors is in the elimination or minimizing of current flow through the probe carriage from one side of the slot to the other. This current flow is a possible source of error since it may easily change the field within the transmission line with a corresponding error in field strength readings. By supporting the probe carriage 17 at the open end 25 of wave guide section 14 there is little likelihood of current flow through the probe carriage 17. This is because of the exponential decay of the field within wave guide section 14. By making the length of this section 14 sufficient to prevent energy from radiating out the open end 25, the field strength at that point is sufficiently low so that very little current will flow from wave guide wall 15 to wave guide wall 16 through the probe carriage 17.

In order to prevent a sharp impedance discontinuity along the coaxial line, it is advisable to produce a method of changing gradually from the characteristic impedance of the unslotted section of transmission line to the characteristic impedance of the slotted section of transmission line. One such method is to provide a tapered section at each end of the slotted section, allowing the slot width to decrease gradually. By means of such a tapered section it is possible to change from the characteristic impedance of the slotted section to the characteristic impedance of the unslotted section without a sharp change which would increase the standing wave ratio of the system.

Fig. 3 shows a cross section of another version of the present invention in which the transmission line consists of a section of rectangular wave guide 50. As the embodiment shown in Figs. 1 and 2, a slot 51 is provided in the wall 52 of wave guide section 50. The slot 51 excites "cut-off" wave guide section 53 formed by walls 54 and 55. A probe carriage 56 is mounted across the open end 57 of wave guide section 53 and supports coaxial line section 30 formed of outer conductor 37 and inner conductor 38 held rigidly in coaxial relationship by insulating beads 39 and 40. Inner conductor 38 extends slightly beyond the end of outer conductor 37 to form pickup probe 41.

This wave guide type detector operates in the same manner as the coaxial type shown in Figs. 1 and 2. It is placed in tandem into a wave guide transmission system whose standing wave ratio it is desired to measure. As in the previous embodiment, the electromagnetic energy which passes through the wave guide section 50 excites the wave guide section 53 through slot 51. Since wave guide section 53 is dimensioned below "cut-off," there is no propagation vertically along it, but a stationary field is set up. This excited field diminishes in amplitude exponentially away from slot 51, and has the same longitudinal variations in strength as that of the field within propagating guide section 50. By moving pickup probe 41 longitudinally within cut-off section 53, the horizontal variations in the field may be measured.

As in the coaxial type of detector, the vertical sensitivity of the probe is decreased sufficiently so that the indicated output does not vary with small mechanical irregularities. At the same time sufficient range of attenuation is provided by intentional vertical displacement of coaxial section 30. This attenuation is, of course, linear with displacement and may be calibrated by the use of a suitable scales or displacement indicating means.

By using the vertical attenuating means, it is possible to make standing wave ratio measurements by means of the "constant deflection" method. Although the slot 51 is wider than provided in conventional slotted standing wave detector, there is little danger of radiation from the open end 57 of the "cut-off" section 53 due to the exponential decrease in induced or excited field. Furthermore, because of the resulting minute field at the open end 57 of wave guide section 53, little or no current flows across from wall 54 to wall 55 through probe carriage 56, eliminating the possibility of errors from improper current phasing and erratic contact resistances.

Although the plates 15 and 16 or 54 and 55 forming the below cut-off wave guide section have been shown as fixed to the edges of the slot, it will be understood that the slot may be narrower than the separation D of the plates, where looser coupling to the main transmission line is desired.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Ultra-high-frequency apparatus for detecting standing waves in an electromagnetic energy transmission system, comprising a section of enclosed wave-energy conductor having an opening in the outer wall thereof, said section of conductor being adapted to propagate wave energy along its longitudinal axis, a wave guide section of substantially rectangular cross-section positioned to be excited at one end through said opening by the wave-energy fields within said first-mentioned section of conductor, said wave guide section being dimensioned below cut-off at the operating frequency for wave-energy excited therein through said opening and having a length sufficient to prevent the propagation of appreciable amounts of said wave-energy therethrough, and means movable along the opening in and along the longitudinal axis of said first-mentioned wave-energy conductor for measuring the strength of the field produced in said wave guide section at a plurality of points within said wave guide section.

2. Ultra-high-frequency apparatus as in claim 1 wherein said opening in the outer wall of enclosed wave-energy conductor consists of a longitudinal slot extending along the axis of said wave-energy conductor.

3. Ultra-high-frequency apparatus as in claim 1 wherein said section of enclosed wave-energy conductor is a coaxial transmission line.

4. Ultra-high-frequency apparatus as in claim 1 wherein said section of enclosed wave-energy conductor is a hollow wave guide transmission line.

5. Ultra-high-frequency apparatus comprising a section of coaxial transmission line having a longitudinal slot in the outer wall extending along the axis thereof, a first rectangular metal plate having one edge joined to the outer conductor of said coaxial transmission line along one edge of said slot and extending the length thereof, said plate being parallel to a plane passing through the center of said section of coaxial line and the center line of said longitudinal slot, a second rectangular metal plate having one edge joined to the outer conductor of said coaxial line section along the remaining edge of said slot and being parallel to said first plate, a pair of end plates each having one edge joined to the outer conductor of said coaxial line section along the respective ends of said slot and two edges joined to the respective opposed ends of said first and second plates which are adjacent to the respective ends of said slot, said first and second plates and said end plates forming a section of wave guide dimensioned below cut-off at the operating frequency and having a length sufficient to prevent the propagation of appreciable wave-energy therethrough at the operating frequency, and a movable energy pick-up element between said plates and adapted to measure the field strength at a plurality of points within said section of wave guide.

6. Ultra-high-frequency apparatus comprising a section of hollow rectangular wave guide having a longitudinal slot in one wall and extending along the length thereof, a first rectangular metal plate having one edge joined to said section of wave guide, said plate being normal to said slotted wall along one edge of said slot, a second rectangular metal plate having one edge joined to said section of wave guide normal to said slotted wall along the remaining edge of said slot, a pair of end plates each having one edge joined to said rectangular wave guide along the respective ends of said slot and two edges joined to the respective ends of said first and second plates which are adjacent to the respective ends of said slot, said first and second plates and said end plates forming a second section of wave guide dimensioned below cut-off at the operating frequency and having a length sufficient to prevent the propagation of appreciable wave-energy therethrough at the operating frequency, and a movable energy pick-up element between said plates and adapted to measure the field strength at a plurality of points within said second section of wave guide.

7. Ultra-high-frequency apparatus for detecting standing waves in an electromagnetic energy transmission system comprising a section of enclosed wave-energy conductor dimensioned to propagate electromagnetic energy excited therein and having an opening in its outer wall, a section of rectangular wave guide conductor coupled to said section of enclosed wave-energy conductor through said opening, said wave guide being dimensioned below cut-off at the operating frequency and having a length sufficient to prevent propagation therethrough of the electromagnetic energy excited therein through said opening, and means movable along the direction of propagation of the electromagnetic energy for measuring the strength of the excited field at a plurality of points within said section of wave guide conductor.

8. Ultra-high-frequency apparatus as in claim 7 wherein said opening in the outer wall of said section of wave-energy conductor consists of a longitudinal slot extending along the axis of said section of wave-energy conductor.

9. Ultra-high-frequency apparatus comprising a first section of enclosed wave-energy conductor dimensioned to propagate energy along the longitudinal axis thereof and having an opening in its wall, a second section of wave-energy conductor coupled to said first section through said opening, said second section being a rectangular wave guide dimensioned below cut-off at the operating frequency and having a length sufficient to prevent the propagation of appreciable wave-energy therethrough at said operating frequency, and means movable along the longitudinal axis of said first section of conductor for measuring the strength of the excited field at a plurality of points within said second section.

10. An ultra-high-frequency apparatus, comprising a first section of wave-energy conductor having an opening in its wall, said section being dimensioned to propagate wave energy along its longitudinal axis, a second section of wave-energy conductor coupled by way of said opening to said first section, said second section being a rectangular wave guide dimensioned to operate below cut-off at the operating frequency and having a length sufficient to prevent propagation therethrough of the wave energy excited therein, a carriage movable along the longitudinal axis of said first section, and a pick-up device carried by said carriage for measuring the strength of the excited field within said second section at a plurality of points therein.

11. Ultra-high-frequency apparatus as in claim 10, further including means for adjustably positioning said pick-up device along a line transversely to the longitudinal axis of said first section of conductor.

12. Ultra-high-frequency apparatus as in claim 10, wherein said opening comprises a slot extending along the longitudinal axis of said first section.

13. Ultra-high-frequency apparatus as in claim 10, wherein said carriage is mounted on said second section of conductor.

14. Ultra-high-frequency apparatus comprising a first section of enclosed wave-energy conductor dimensioned to propagate energy along the longitudinal axis thereof and having an opening in its wall, a second section of wave-energy conductor coupled to said first section through said opening, said second section being a rectangular wave guide dimensioned below cut-off at the operating frequency and having a length approximately equal to one-half wavelength at the operating frequency, and means movable along the longitudinal axis of said first section of conductor for measuring the strength of the excited field at a plurality of points within said second section.

15. Ultra-high-frequency apparatus comprising two mutually spaced conductive members having opposed surfaces of substantially rectangular shape, a pair of conductive end members having opposed surfaces respectively interconnecting the respective opposed narrow end portions of said first-named members, said first-named members and said end members constituting a below cut-off wave guide section at the operating frequency and having a length sufficient to prevent the propagation of appreciable wave-energy therealong at the operating frequency, a conductive rod extending substantially perpendicular to the length dimension of said wave guide section and substantially parallel to said first-named surfaces and in the proximity thereof, electromagnetic energy conveying means connected for supplying electromagnetic energy for setting up a travelling electromagnetic field between said rod and said surfaces, and a probe extending into the space between said surfaces and movable longitudinally of said rod for measuring the strength of the electromagnetic field in the space between said surfaces.

16. A standing-wave detector comprising two mutually spaced conductive members having parallel opposed surfaces of substantially rectangular shape, a pair of conductive end members having parallel opposed surfaces respectively interconnecting the respective opposed narrow end portions of said first-named members, said first-named members and said end members constituting a below cut-off wave guide section at the operating frequency and having a length sufficient to prevent the propagation of appreciable wave-energy therealong at the operating frequency, a conductive rod extending substantially parallel to said first-named surfaces and adjacent thereto and extending perpendicular to the length dimension of said wave guide section, electromagnetic energy conveying means connected to the respective end members and to the respective ends of said conductive rod for supplying energy for establishing a travelling electromagnetic field between said rod and said surfaces and causing said electromagnetic field to be propagated longitudinally along the space between said rod and said first-named surfaces, and a probe extending into the space between said surfaces and movable longitudinally of said rod for measuring the strength of the electromagnetic field in the space between said surfaces.

17. Ultra-high-frequency apparatus comprising an electromagnetic energy transmission conduit for conducting travelling waves of ultra-high-frequency energy along its longitudinal axis, said conduit including an outer conductor having an elongated slit therein parallel to its longitudinal axis, a rectangular wave guide section having a pair of spaced substantially parallel conductive walls extending along the sides of said elongated slit, said wave guide section being dimensioned below cut-off at the operating frequency and having its length dimension perpendicular to said axis and parallel to said conductive walls, said length dimension being at least of the order of magnitude of the spacing between said walls and being at least of the order of magnitude of the maximum cross-sectional dimension of said conduit, the length of said slit and the coextensive dimension of said parallel walls being appreciably greater than the spacing between said walls, said conduit including means for providing lines of magnetic flux directed substantially perpendicularly between said walls in response to the energy conducted along the longitudinal axis of said conduit, and a movable probe extending substantially parallel to said conductive walls into the space between said walls for measuring the strength of the electromagnetic field in the space between said walls.

JOHN R. WOODYARD.

REFERENCES CITED

The following references are of record in the file of this patent:

UNITED STATES PATENTS

| Number | Name | Date |
|---|---|---|
| 2,106,713 | Bowen | Feb. 1, 1938 |
| 2,155,508 | Schelkunoff | Apr. 25, 1939 |
| 2,203,481 | Jottu | June 4, 1940 |
| 2,306,282 | Samuel | Dec. 22, 1942 |
| 2,411,553 | Ramo | Nov. 26, 1946 |
| 2,423,506 | Landon | July 8, 1947 |
| 2,427,752 | Strempel | Sept. 23, 1947 |
| 2,439,527 | Paulson | Apr. 13, 1948 |
| 2,454,042 | Dettinger | Nov. 16, 1948 |